Figure 1:
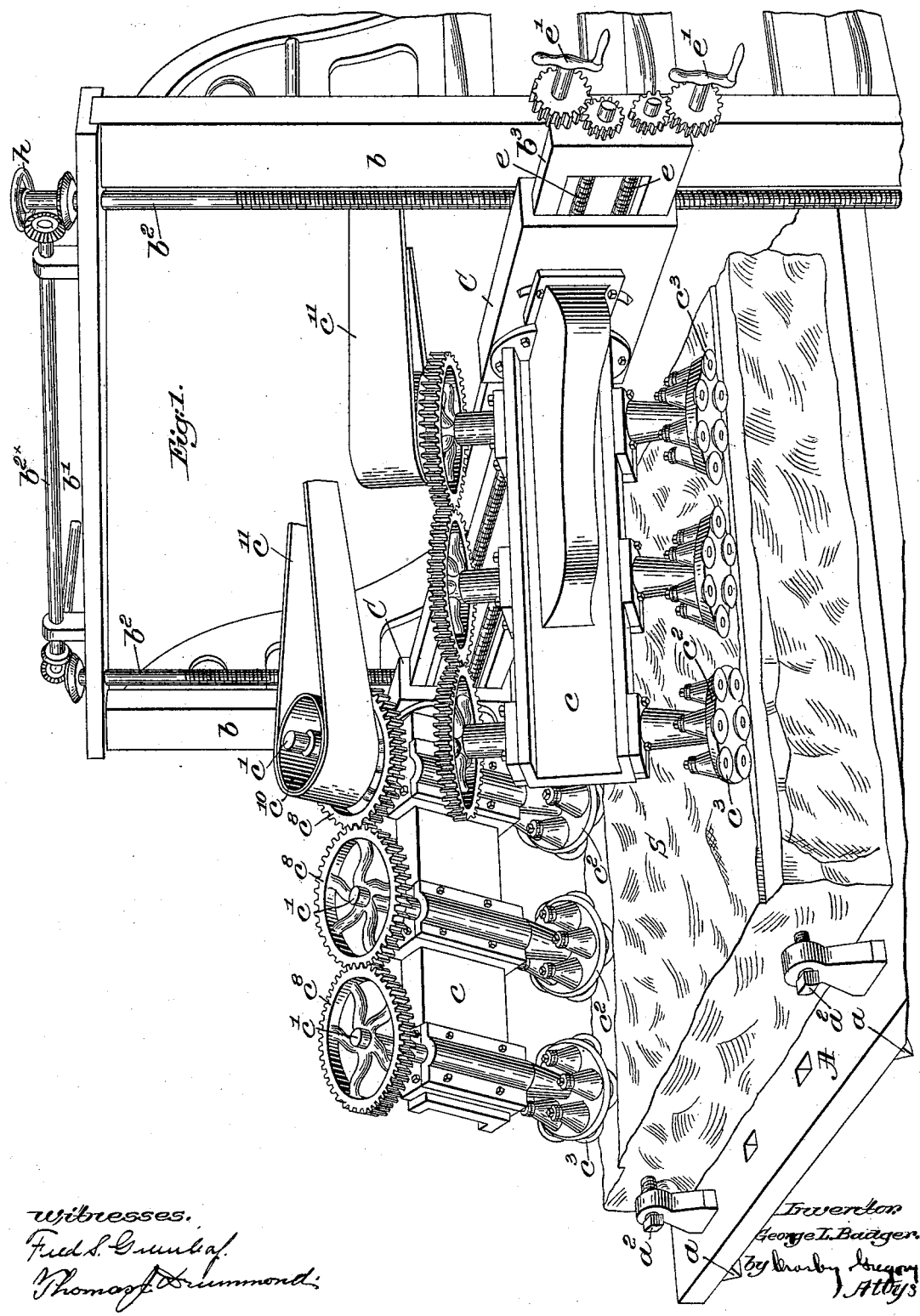

(No Model.)  3 Sheets—Sheet 1.

G. L. BADGER.
STONE WORKING MACHINE.

No. 594,589.  Patented Nov. 30, 1897.

(No Model.) 3 Sheets—Sheet 3.

G. L. BADGER.
STONE WORKING MACHINE.

No. 594,589. Patented Nov. 30, 1897.

Witnesses.
Fred S. Greenleaf.
Thomas J. Drummond

Inventor.
George L. Badger.
By Crosby & Gregory.
Att'ys

UNITED STATES PATENT OFFICE.

GEORGE L. BADGER, OF QUINCY, MASSACHUSETTS.

STONE-WORKING MACHINE.

SPECIFICATION forming part of Letters Patent No. 594,589, dated November 30, 1897.

Application filed July 27, 1896. Serial No. 600,658. (No model.)

*To all whom it may concern:*

Be it known that I, GEORGE L. BADGER, of Quincy, county of Norfolk, State of Massachusetts, have invented an Improvement in Stone-Working Machines, of which the following description, in connection with the accompanying drawings, is a specification, like letters on the drawings representing like parts.

This invention has for its object the production of a novel process and machine for working stone to a finished, usually plane, surface. Prior to my invention machines for this purpose have been constructed containing a spider or tool-holder mounted to rotate about an axis perpendicular to the desired finished surface of the stone and carrying at its edge or periphery a plurality of rotatable wheels or tools which, on rotation of the carrier, are rolled about in the path of a circle upon the stone surface, said wheels or tools by their continuous rolling upon the stone acting to crush or crumble the same down to a finished surface, which is a plane coincident with the plane in which the cutting edges of the tools roll. In machines of this type (of which the patent to Brunton and Trier, No. 252,724, dated January 24, 1882, presents an example) the rotating tools roll upon and in contact with the stone for a considerable period of each rotation of the carrier, and because the stone is crumbled off by the pressure or crushing action of the tools thereupon great pressure must necessarily be applied to the rotating tools and the movements are necessarily slow if any considerable portion of the stone is to be removed, as there must be in order to make the machines practical for everyday use.

I have sought to devise a machine for economically removing the greatest possible amount of stone with the least pressure upon the tool or tools and with the least wear on the machine and to provide such a construction as shall be capable of operation at high speed. In my efforts to devise such a machine I have found, first, that the tool should be a rotatable tool, in order that when brought in contact with the stone it may be rotated to a greater or less extent, as may be necessary to prevent a cutting or knife-like action, which would almost immediately ruin the tool. I have also found that it is impossible to operate a machine at a high rate of speed and without excessive wear upon the tools if the latter are caused to roll in constant contact with and to remove the stone by pure pressure or crushing; but that to remove the stone economically the tools, besides having this rotating or yielding capability, should be brought into contact with the stone surface with a sharp impact, delivering clean-cut blows, and depending on the rapid succession of fracturing blows to chip away the stone rather than on the rolling pressure or crushing action, as heretofore. To accomplish this latter result, I mount, preferably, a series of rotatable tools upon a rotatable carrier, preferably a disk arranged to rotate in a plane at an acute angle with the surface of the stone operated upon, so that rotation of the carrier will bring the tools successively into the plane of the stone surface and cause the tools to deliver a rapid succession of blows upon the stone surface and at an angle therewith determined by the angle of the plane of rotation of the carrier. For the best practical results, according to the present construction of my machine, so far as I have determined, this plane should be at an angle of twenty degrees or more to the stone surface, the tools striking the stone at approximately their lowest point of travel. The blows are thus delivered with an impact substantially in the plane of the finished surface, and the stone is chipped off instead of rolled or crushed off. When the blows are struck, the tools rotate upon their individual axes to a greater or less extent, thereby preventing any cutting or knife-like action without lessening the force of the blows. The blows are sharp and rapid and act to crack the stone away in chips, and being delivered in a plane oblique to the stone surface and substantially in the coincident line of said plane and the plane of the finished surface, as explained, there is practically no downward impact, the blows acting to break off chips or pieces from the edge or wall of the unfinished portion of stone above them instead of below them, thus utilizing the rift and grain of the stone to the best advantage.

Another part of my invention relates to the manner of feeding the tools to the work. In the machines heretofore constructed, referred to, it has been customary to feed these rotating tools directly across the stone surface or against the breast of the tools, they cutting or finishing a path or swath, as it were, of a width corresponding to the diameter of the carrier and working always in a curved path, which is the path of rotation of the several tools as they roll upon the stone surface. Aside from the fact that this arrangement necessitates the keeping of the tools in contact with the stone surface for a long period at each rotation of the carrier, the method is further objectionable, because the wear on the tools is enormous, due to the slip or attrition between the tools and stone caused by the direction of feed being transverse to the main direction of the path of rolling contact of the tools, and, further, because the stone surface when finished presents a series of arc-shaped lines representing the paths of the cutters, whereas it is desirable to produce a surface wherein the tool-marks run always in straight or parallel lines as nearly as possible like the surface left by the usual bush-hammer.

In accordance with my invention I feed the tools to the work by a relative movement of the tools and work produced by moving either or both, the relative movement taking place in a direction tangent to and in the plane of the path of movement of the revolving tools at the lowest point in that path of movement—that is to say, the feeding movement is in the direction of the line of intersection of the plane of revolution of the tools and the stone surface, so that there can be no attrition of the stone transversely to the edges of the tools, inasmuch as there is no movement in that direction, and there is no attrition in the direction of the blow because the tools have the yielding capability, being freely rotatable. This causes the successive blows of the tools to be delivered always in a straight line until the tools have traversed the entire length or breadth of the stone, when the operation is repeated slightly to one side of the former path of movement to remove another strip of stone, the tool-marks left upon the stone being parallel and presenting an appearance resembling the marks of the bush-hammer.

My invention further comprehends the process by which the stone is removed and also various details of construction and arrangement of parts of the machine, to be hereinafter described, and pointed out in the claims.

Figure 2:
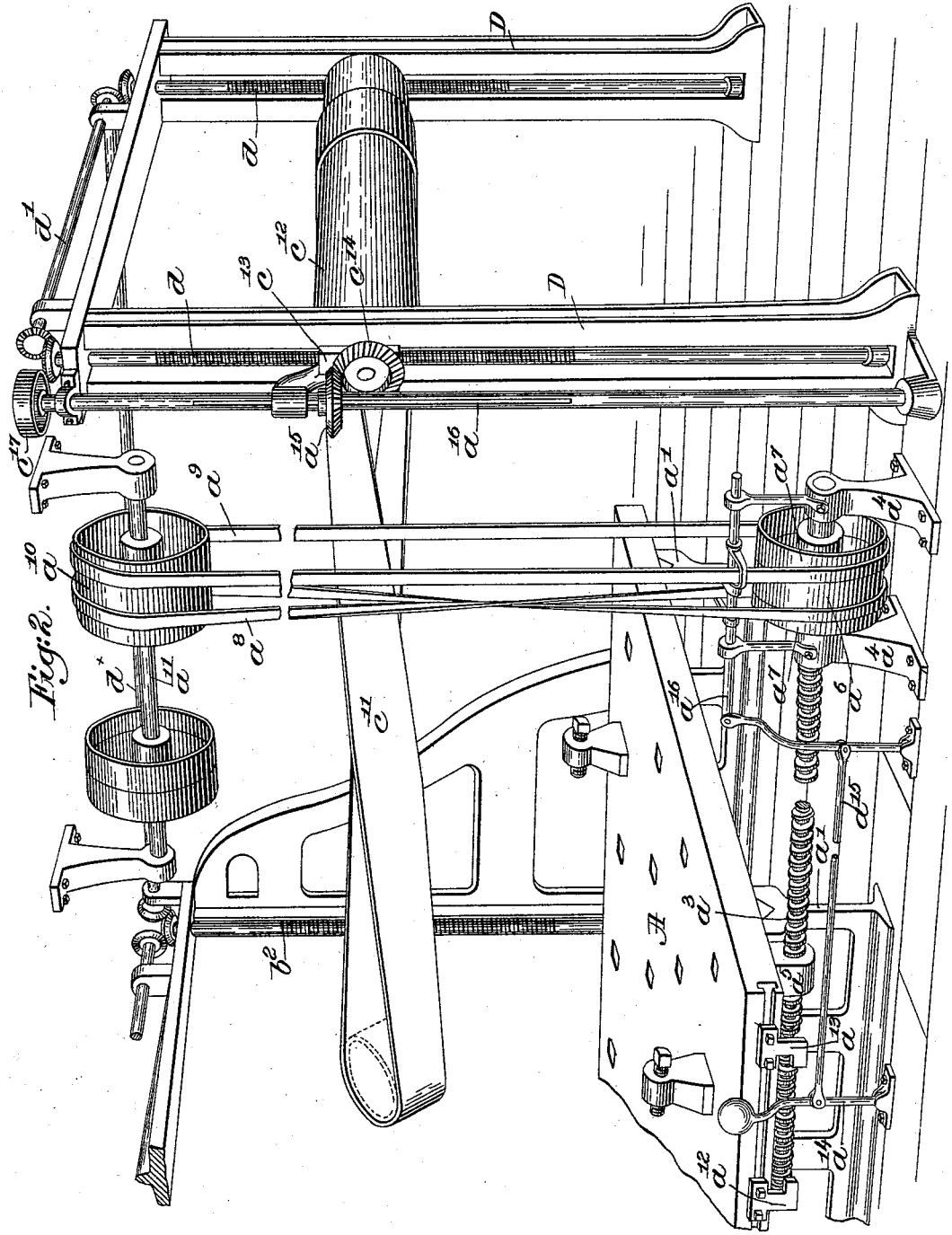
Figure 3:
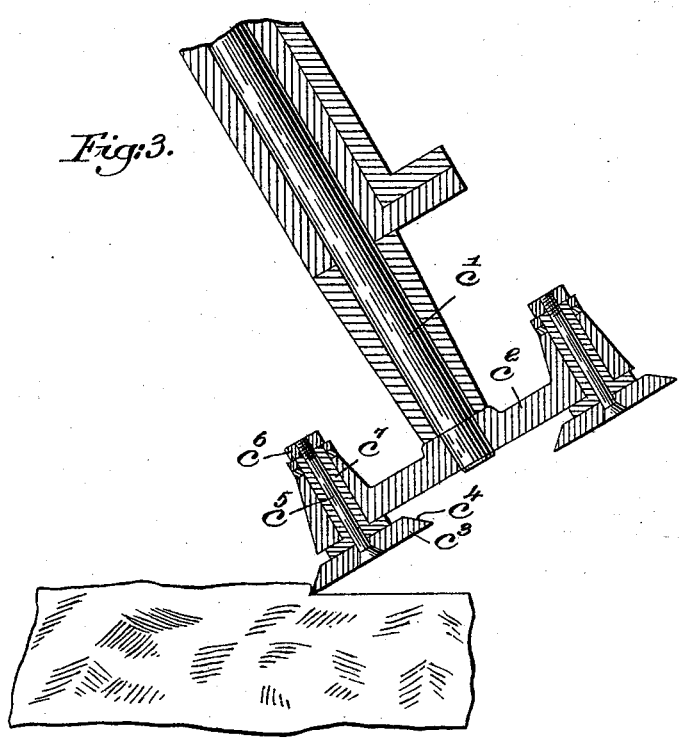
Figure 4:
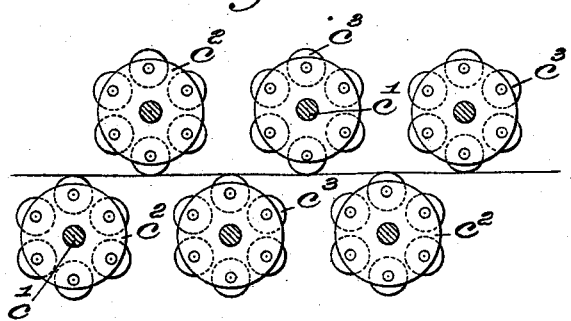

In the drawings, Figure 1 is a perspective view illustrating a part of a machine embodying my invention, this figure showing the tools for working stone; Fig. 2, a perspective view of the rear portion of the machine not shown in Fig. 1, this figure showing the driving mechanism; Fig. 3, an enlarged sectional detail of the tool-carrier and its tools, showing the angle of revolution of the tools and the action of the same upon the stone; Fig. 4, a diagram illustrating the preferred arrangement of the tools in the machine.

Referring to the drawings illustrating one embodiment of my invention, A is one form of work-support, shown as a bed, provided at its under side with depending slides $a\ a$, adapted to travel in suitable ways or tracks in the base-castings $a'$. (See Fig. 2.) This traveling work-support is preferably provided with suitable means, as the clamping devices $a^2$, for securing in position upon the support a block of granite or other stone S, as shown in Fig. 1.

The traveling support A is reciprocated in the present instance by a feed-screw $a^3$, mounted in suitable supports $a^4$ and working in a nut $a^5$ on the support A, said feed-screw being driven by a pulley $a^6$, at opposite sides of which are the loose pulleys $a^7$, crossed and open belts $a^8\ a^9$ connecting the said pulleys with a pulley $a^{10}$ on a counter-shaft $a^{11}$, suitably supported and driven in desired manner.

The traveling support A is shown as provided with two projections or arms $a^{12}\ a^{13}$, which at or near the opposite ends of the reciprocating movements act upon the pivoted lever $a^{14}$ and move the same first in one and then in the opposite direction, to thereby, through the connecting-rod $a^{15}$ and the belt-shifting mechanism $a^{16}$, shift the belts $a^8\ a^9$ alternately upon the driving-pulley $a^6$ to rotate the screw first in one and then in an opposite direction to cause it to impart the reciprocating movements to the traveling support.

Erected over the traveling support A is a frame comprising the standards $b\ b$, connected by a cross-bar or crown-piece $b'$, and in this frame are suitable bearings for the vertical threaded shafts or screws $b^2\ b^2$, which pass through suitable nuts at the back of a horizontal and vertically adjustable supporting-bar $b^3$, which on rotation of the threaded shafts $b^2$ may be moved up or down for purposes of adjustment, as will be hereinafter referred to. On this horizontal supporting-bar $b^3$ are mounted to slide horizontally the heads C, provided with the laterally-extended arms $c$, shown as standing at an acute angle with the surface of the traveling support A and at their inner adjacent sides provided with suitable bearings for the shafts $c'$, shown as six in number, three mounted on each arm and carrying at their lower ends the tool-carriers $c^2$, shown as in the form of disks.

Each tool-carrier $c^2$ has pivotally mounted upon it a plurality of rotatable tools, herein shown as six in number, and in the present embodiment of my invention said tools, shown as disks $c^3$, having beveled edges $c^4$, are secured by bolts $c^5$ and nuts $c^6$ to suitable bushings $c^7$, journaled in bearings in the said tool-carrier and preferably parallel with the shaft $c'$, the said bushings, bolts, and tools rotating as one part. The disks $c^3$ are peripherally beveled, so as to present a wedge-shaped edge or sharp cracking edge to more readily strike the stone with a fracturing blow, this edge having its upper surface inclined obliquely to the stone surface at the moment of impact therewith, so that besides the sharp blow there may also be a wedging uplifting action accompanying the blow. This supplements, as it were, the lateral and upward fracturing effect of the blow, due to the impact thereof being delivered substantially horizontally, as stated, and without any downward crushing action whatever and results in a remarkably easy and rapid dislodgment of the chips or broken-off fragments. While this construction is a good one, my invention is not limited to any particular means of pivoting the tools to the carrier therefor, nor is it otherwise limited to the precise construction shown. The tools are given forward-and-backward and falling-and-rising movement or cycle of movements in regular and rapid succession, so as to strike decided blows approximately as they reach the lowest point in their travel, and depending upon this series of distinct blows for fracturing the stone surface and not upon rolling or crushing away the surface of the stone. Also, according to the construction shown, this being my preferred form, one tool having delivered a blow frees itself from the stone before another blow is struck, or, in other words, the blows are absolutely distinct and are not confused one with another.

Inasmuch as the arms $c$ and the bearings thereon for the shafts $c'$ stand at an acute angle with the surface of the traveling work-support, it follows that in the construction shown the disk-like tool-carriers $c^2$ must necessarily rotate, as shown, in planes also standing at acute angles with the surface of the work-support and necessarily with the surface of a rectangular block of stone arranged upon the said work-support, as best shown in Fig. 3. Referring to said figure and to Fig. 1, it will be evident that rotation of the tool-carriers will cause their respective rotatable tools $c^3$ to successively strike—that is, deliver in succession—sharp blows upon the surface of the stone at an acute angle therewith, the impact of the blows being delivered at the lowest point of travel thereof substantially in the plane of the dressed surface, to chip the stone off in pieces by lateral and upward fractures, each blow struck removing a small piece of the stone.

By making the tools rotatable upon their carriers the blows struck are none the less effective and the life of the tools is prolonged, because they are free to rotate about their respective pivots after the blows are struck as they are momentarily passing the stone surface, thereby by this yielding capability preventing any scraping or cutting action of the tools on or into the stone, which so quickly ruins the tools. This yielding capability of the tool also greatly enhances the value thereof in wedging off the fractured chip, for while the tool strikes its blow and then leaves the stone instantly without any appreciable crushing action there is a succeeding instant of wedging contact of the edge of the tool with the stone surface during the moment that the carrier is carrying the axis of the tool past its lowest point. It is also evident that by mounting the tools and operating the same in the manner described the blows may be delivered in rapid succession and therefore correspondingly lighter, enabling the machine to be more simply and lightly constructed to render it cheaper to build and easier to handle.

The several shafts $c'$, with their tool-carriers and tools, are rotated or operated in any suitable or desired manner, herein by gearing all the shafts on each arm together by means of usual gear-wheels $c^8$ and providing one of the shafts on each arm—for example, that nearest the frame $b$ $b$—with a pulley $c^{10}$, said pulleys being driven by belts $c^{11}$ from and by a suitable driving-cylinder $c^{12}$, journaled in suitable bearings $c^{13}$, made vertically adjustable in a suitable frame D, erected at the back of the machine.

The bearings $c^{13}$, referred to, are adjusted vertically by means of threaded shafts $d$, journaled in the said frame D and geared at their upper ends to a common connecting-shaft $d'$, whereby simultaneous rotation of the said shafts $d$ is provided for simultaneous adjustment of both the bearings $c^{13}$.

To drive the cylinder $c^{12}$, I have provided the same at one end with a beveled gear $c^{14}$, driven by an intermeshing gear $c^{15}$, splined upon a vertical driving-shaft $c^{16}$, mounted in suitable bearings on the standard C and provided at its upper end with a driven pulley $c^{17}$, belted and driven in suitable manner, so that whatever be the vertical position of the driving-cylinder $c^{12}$ it receives its motion from the driving-shaft $c^{16}$.

Referring now to Fig. 1, the threaded adjusting-shafts $b^2$ there shown are geared at their upper ends to a common connecting-shaft $b^{2\times}$, and one of the said shafts $b^2$ is provided with a hand-wheel $h$, by which it and its corresponding shaft at the other side of the machine may be simultaneously rotated for vertical adjustment of the supporting-bar $b^3$, carrying the bearings for the tools, and I have herein connected one of the shafts $b^2$ by means of gearing and a connecting-shaft $d^\times$ with one of the shafts $d$ for adjusting the driving-cylinder, whereby adjustment of the supporting-bar $b^3$ causes simultaneous adjustment of the driving-cylinder, in order that adjustment of the tools for blocks of stone of different sizes will automatically cause corresponding adjustment of the driving mechanism to operate the tools for the desired block.

I have now described the construction and operation of the tools and mechanism for driving the same, and will next describe the means for feeding the tools to their work.

It will be noticed that the tool-carriers on each arm are shown as in line, respectively, with each other, so that all the tools mounted upon each arm act in a single straight line parallel with the direction of travel of the work-support, and as the work-support reciprocates beneath the rotating tools the latter will make a straight cut or path lengthwise the stone surface and parallel with the direction of travel of the work-support. Having made one such cut, it is necessary to set all the tools or the carriers therefor over for another cut parallel therewith, and to accomplish this I have provided the supporting-bar $b^3$ with two horizontal threaded shafts $e\ e$ in threaded engagement, respectively, with the heads C C and each geared to and adapted to be rotated by a suitable handle $e'$ at one side of the machine. By means of these handles after each reciprocating movement of the traveling work-support the arms $c\ c$ may be moved closer to each other to cause the tools upon the next reciprocating movement to cut a new path across the stone, and in this way the said cutters are caused to cut or, as it were, work inwardly from opposite edges of the stone until they meet at the middle, as best shown in Fig. 1, thus dressing the stone to a sharp finished edge on either side.

In the preferred embodiment of my invention the tools on one of the arms are staggered with relation to the tools on the other arm, as illustrated in Fig. 4, in order that by suitable mechanism they may be brought closer one to the other, and even brought so close as to completely finish the stone surface without leaving a ridge to be worked off by either set alone, as would be the case were it not possible to bring the two series of tool-carriers into position, one series overlapping the other, as in Fig. 4. It is obvious that my invention is not restricted to dressing plane surfaces nor to a rectilinear feeding movement.

The distinguishing feature of my invention lies in a tool yieldingly mounted upon a carrier having a forward-and-back and rising-and-falling movement lying in a plane standing at an acute angle with the stone surface, to thereby cause a succession of blows to be delivered upon the stone surface at an acute angle therewith and substantially in and on the coincident line of said plane with the dressed surface, so as to strike under portions of the stone and by lifting break off the said stone surface in pieces, as distinguished from rolling a wheel upon the surface to remove the stone by pure crushing or crumbling and also distinguished from blows delivered in a truly vertical plane, which strike from the surface inwardly and not from below the surface outwardly.

I do not intend to restrict myself herein to a rotatable carrier nor to rotatable tools, inasmuch as a vibrating or other movement of any yielding tool or tools is within my invention.

The method of feeding the tools to the work constitutes another important part of my invention, for the blows of each series of tools—that is, the tools carried by each of the arms $c\ c$—are delivered in parallel straight lines, the stone and tools having a relative feeding movement in the direction of a tangent to and in the plane of the path of revolution of the several tools at the lowest point or level of the said path of revolution as distinguished from feeding movements at right angles to said tangent—that is, in the direction of a plane passed through the axis of the tools—and the points of contact of the same with the stone surface, as in machines heretofore constructed. Machines of the latter kind—that is, of the Brunton *et al.* type—as before mentioned, do not cut along a line nor in straight lines, but cut a wide path or swath made up of eccentric circles or arcs, and the feed is practically at right angles to the direction of the main rolling contact of the tools, so that, for instance, if there is an inch of feed during the contact of one tool there must be an inch of transverse slip or rub of the tool over the stone. This rub or attrition quickly ruins the tools and has proved an insurmountable obstacle to such machines. When the feed of the stone was increased sufficiently to render the service of the machine practical, then the fatal attrition at once ruined the tools, so that it has resulted that the feed must be very slow and commercially impracticable in order that the life of the tools or cutters may be reasonably prolonged.

It was proposed in the patent referred to to positively rotate the rolling cutters in the carrier, giving them a backward rotation opposite to the forward rotation of their carrier, so that their peripheries would roll and not slide forward on the surface of the stone; but this provision only insured that there would be no forward drag, or "knife-like action," as I have termed it, of the disk cutters on the stone and entirely failed to avoid the transverse drag or attrition to which I refer above, due to the feeding of the stone against the breast of the rolling cutter. A freely-rolling cutter might catch and drag ahead on the stone, thereby bringing not only all this forward wear, but also the lateral wear or attrition due to the feed, to bear on the one contacting spot or tread of the periphery of the cutter, whereas by providing positive rotation for the rolling cutter there could be no drag or forward wear and the lateral wear or lateral attrition would be distributed rapidly and evenly over the whole circumference of the cutter as the latter rolls along in its continuous but rapidly-changing contact. My invention, however, contemplates, in the first place, distinct and yielding blows. In the second place there is a rapid and not a slow feed of the stone, and this feed is in the direction in which the blows are delivered; also, all the relative progressive movements or cycles of movements of the tools are in one plane oblique to the stone surface, and the line where this plane cuts the plane of the finished stone surface is approximately the line in and along which all the blows are given, and preferably there is but one tool in contact with the stone at one time. The blows are delivered in this line and against the base of the unfinished portion of the stone. I depart radically from all machines of the Brunton type in depending upon blows, as such, distinguished from crumbling, to do the work and in successfully avoiding the plowing, rolling, and crushing action, with all of its attendant and destructive attrition; also, I depart radically in not depending upon any downward pressure, but rather upon causing lateral and uplifting fractures by which the stone is rapidly chipped away along straight lines.

By opposing one set of cutters over against the other set, as explained, whereby the action of one set of cutters is supplemented or supported by the other, I am enabled to take deep cuts which would be impossible, other things remaining the same, with one set of of cutters alone.

My invention therefore is not limited to the particular shape or construction of the various tools, the carriers therefor, or the means or mechanism for operating and feeding the same herein shown and described, for it is evident my invention as herein set forth may be embodied in various forms or constructions without departing from the spirit and scope of the invention.

Having described my invention, what I claim as new, and desire to secure by Letters Patent, is—

1. A machine for working stone containing a work-support for the stone, and working mechanism comprising one or more yielding tools, and means to impart to the same a rapid combined forward-and-back and rising-and-falling movement, all in a plane oblique to the stone surface to cause said tools to rapidly and sharply strike the stone surface, the tool delivering one blow freeing itself from the stone before the next blow is struck, whereby the stone is cracked off by a rapid succession of sharp blows, and means to cause a relative feeding movement of said work-support and working mechanism in substantially the direction of the forward movement of said tool or tools at the time of delivery of said blows, whereby a finished surface presenting parallel substantially straight lines may be had, substantially as described.

2. A machine for working stone, containing a work-support for the stone, and working mechanism, comprising one or more yielding tools, means to impart to said tools a rapid repetition of combined forward-and-back and falling-and-rising movements all in one and the same plane oblique to the stone surface, to cause the said tools to rapidly and sharply strike the stone surface, said mechanism being arranged to deliver the impact of the blows substantially in the plane of the finished surface and in the coincident line therewith of said oblique plane, and means to cause a relative feeding movement of said work-support and working mechanism in the direction of said coincident line, whereby a finished surface presenting parallel substantially straight lines may be had, substantially as described.

3. A machine for working stone, containing a work-support for the stone, one or more freely-rotatable disk tools, means to revolve the same in an oblique plane at an angle of twenty degrees or more to the stone surface, and to cause said tools to sharply strike the stone at approximately their lowest point of travel, said disks being peripherally beveled to a wedge-shaped edge, the upper surface of said edge at the moment of impact thereof being oblique to the stone surface, and means to cause a relative feeding movement of said work-support and tools in the direction of the line of intersection of said plane of revolution and the stone surface, substantially as described.

4. In a machine for working stone, a work-support, one or more rotatable tools and a carrier for and to move the said tool or tools to and from the stone in a plane at an acute angle with the stone surface to thereby chip away the stone surface, said tools being arranged to deliver a rapid succession of sharp blows progressively approximately in and on the line of intersection of said plane and the plane of the finished surface, and to instantly leave the surface after striking the blow, and means to relatively reciprocate the said carrier and work-support in the direction of said line of intersection, whereby the said tool is capable of acting upon and to remove the stone on the said relative movement in either direction in said line, without necessary reversal of the angle of the plane in which the said rotatable tool is moved to and from the stone, substantially as described.

5. In a machine for working stone, a work-support, one or more rotatable tool-carriers arranged at each of two opposite sides of said work-support, one or more tools rotatably mounted on and to be revolved by the respective carriers in planes at acute angles with the stone surface, whereby rotation of said carriers causes the said tools to deliver a succession of blows upon the said stone surface, and means to impart a relative feeding movement to the said work-support and carriers in substantially the direction in which the said blows are struck, and means to move the said carriers one toward the other and inwardly from the edge or edges of said work-support, to operate, substantially as described.

6. In a machine for working stone, a work-support, a plurality of rotatable tool-carriers arranged at or near opposite sides of the said work-support, tools rotatably mounted upon and to be revolved by rotation of said carriers in planes at acute angles with the stone surface to thereby deliver a succession of blows upon the latter, and means to impart a relative movement to the said work-support and carriers, in substantially the direction in which said blows are delivered upon the stone surface, and connecting adjusting devices, between carriers at opposite sides said work-support, whereby simultaneous adjustment of the carriers so connected may be had to insure accuracy of product, substantially as described.

7. In a machine for working stone a rotatable tool-carrier, and a plurality of yielding disk tools rotatably mounted on said carrier and having their working edges or perimeters lying in one and the same plane oblique to the stone surface being worked and arranged to deliver a succession of blows, substantially as described.

In testimony whereof I have signed my name to this specification in the presence of two subscribing witnesses.

GEORGE L. BADGER.

Witnesses:
GEO. H. MAXWELL,
ANDREW W. DUNBAR.